Patented Aug. 26, 1952

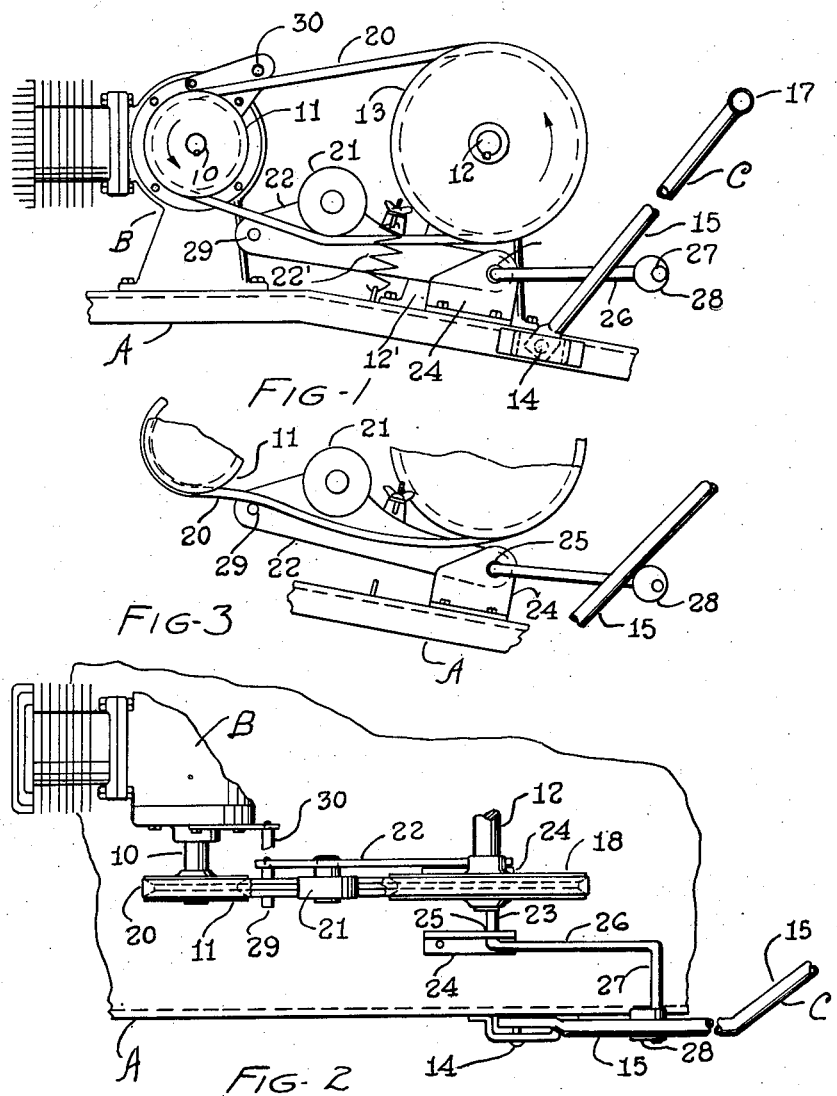

2,608,102

UNITED STATES PATENT OFFICE 2,608,102

TRANSMISSION AND CLUTCH SYSTEM

Ellsworth D. Wilkin, Ottumwa, Iowa, assignor to Johnston Lawn Mower Corporation, Ottumwa, Iowa, a company of Iowa Application August 13, 1948, Serial No. 44,100

1 Claim. (Cl. 74—242.1)

The present invention is particularly adapted for use on lawn mowers and small garden tractors and has for its objects providing a transmission and clutch which is very simple, efficient, easily operated and can be manufactured at low cost.

An object of the present invention is to provide means, whereby the operator can disengage the transmission by preferably pressing down on the guiding handle or by allowing the weight of the guiding handle to release the clutch by gravity.

A further object of the present invention is to provide a transmission and clutch system which does not need a housing, thus to save cost and weight and keep the system in full view of the operator at all times.

An important object of the present invention is to provide a transmission and clutch system which can be operated safely by a child, because the clutch is always under convenient and easy control of the operator and is automatically disengaged when the operator's hands are removed from the handle bar.

To these and other useful ends, not already enumerated, my invention consists of parts, combinations of parts or their equivalents and mode of operation as hereinafter described and claimed and shown in the accompanying drawings in which:

Fig. 1 is a side elevational view of the platform of a self propelled lawn mower having mounted thereon an internal combustion engine and my improved transmission and clutch showing the belt or clutch in an engaged position.

Fig. 2 is a top view of the device as shown in Figure 1.

Fig. 3 is a fractional or clutch controlling detail of the means showing its position when the transmission is disengaged.

In the figures A designates the platform or frame of the mower. B designates the engine which is generally mounted on the forward side of the platform. C see Figure 1 designates the guiding handle bars of the device in a normal operating position with the clutch engaged.

Engine B is provided with a crank shaft 10 having mounted thereon preferably a V-belt pulley 11. A transmission shaft 12 is rotatably mounted on a post 12′ which is secured to platform A in any suitable manner and is positioned a short distance from crank shaft 10 about as shown.

Shaft 12 has mounted thereon preferably a V-belt pulley 13. At the other end of this shaft means are preferably provided (not shown) for driving the ground wheels of the tractor or mower and for driving the cutter bar or rotor.

Member C comprises two bars 15 (one not shown), the forward ends of which are pivoted to platform A preferably as at 14, and on opposite ends of member A. Bars 15 converge rearwardly from pivot 14 to a hand grip handle 17 lawn mower fashion. Member C is shown in Figure 1 with its rear end in an elevated or clutch engaged position; therefore as will hereinafter appear the belt or clutch is operated preferably by raising or lowering the handle bar. I provide means whereby the weight of the rear end of member C may be used to release the clutch as follows:

A belt 20, preferably of the V-belt type is provided for forming an operating connection between pulleys 11 and 13, the belt being adapted normally to fit loosely over the pulleys.

I provide a control arm 22 which is pivotally mounted as at 25 on brackets 24—24, the brackets being secured to frame A. I mount an idler pulley 21 on control arm 22 in the position shown, the pivot mounting of member 22 comprises a shaft 23. This shaft has a rearwardly extending member 26 with an extension 27 at its end. On member 27 I preferably mount an eccentric pulley 28 which may be held in any desired adjusted position by means of a set screw or otherwise so as to change the height of the rear end of member C when it is in contact with this pulley. Clearly other means may be provided for changing the height of handle bar 17 when the clutch is released.

On the forward end of member 22 I provide a pin 29 so that when member 17 moves down for disengaging the clutch the belt will be contacted by the pin and lifted slightly as indicated in Figure 3.

I also mount a stationary pin 30 on a suitable engine held bracket which is positioned very close to belt 20 when the belt is in operation. This pin cooperates with pin 29 to actually hold the belt away from pulley 11 when the clutch is released.

It will be seen that handle bar 17 has a dual purpose namely for guiding the tractor and for starting and stopping the tractor. For starting the tractor all that is necessary is to lift member 17, as in the operation of an ordinary, namely pushed type lawn mower. This will permit the clutch to be engaged automatically and clearly by removing the hands from member 17 or permitting the weight of this member to contact member 28 the tractor will be stopped.

It has been found that very little pressure on the belt by pulley 21 is necessary to operate the machine and that very little pressure of pin 29 against the belt will fully release the clutch and stop the belt from turning, therefore the up and down movement of member 28 will cause the device to act similar to a standard clutch when thrown on and off. It has been found by practice that it is advisable to provide a sensitive spring 22', strong enough to insure against belt slippage, but not strong enough to prevent the weight of the guiding means from disengaging the clutch.

While operating the device member 17 is held about in the position shown in Figure 1 and the tractor guided while in this position. Clearly if one should release his hand hold on member 17 or stumble and fall for any reason whatsoever, the tractor would stop. Clearly therefore applicant has devised a transmission and clutch system which meets all of the requirements outlined in the preamble of this specification.

It will be understood that I do not wish to be limited to the specific means for engaging and disengaging the transmission clutch system. It may clearly be done by means of a lever positioned on or near member 17 having a connection to member 22 for disengaging the clutch or this lever may be used for both engaging and disengaging the clutch with or without the use of spring 22'.

Clearly many minor detail changes may be made in the design shown without departing from the spirit and scope of my invention as recited in the appended claim.

Having thus shown and described my invention, I claim:

In a transmission for a power driven lawn mower comprising in combination, a mower frame having an internal combustion engine mounted thereon, said engine having a relatively small diameter V belt pulley secured to its crank shaft, a post secured to said frame a distance in rear of said engine, a shaft rotatably mounted on said post and having secured thereto a relatively large in diameter V belt pulley and in alignment with said first pulley, a V belt adapted normally to form a loose connection between said pulleys, a forwardly extending idler pulley bracket with an idler pulley rotatably mounted thereon and positioned substantially midway said pulleys and above the lower part of said belt, a pin mounted on said pulley bracket a short distance forward of said idler pulley and below the lower part of said belt when the idler pulley is engaged, the rear end of said forwardly extending bracket having secured thereto a transversely arranged shaft and being hingedly mounted on said mower frame, a spring forming a connection between said forwardly extending bracket and the mower frame for tightening the belt, said pin being positioned whereby when said bracket is raised for loosening the belt it will contact the belt and act to partially support the same, said last shaft being extended rearwardly and having a transversely arranged extension on its free end, a manually operated guiding means hingedly mounted at its forward end to said frame and extending rearwardly and upwardly and a distance above said transversely arranged extension, said last transversely arranged extension having an adjustable cam mounted thereon for contact with said rearwardly extending guiding means for disengaging said idler pulley and engaging said pin and for determining the height of the rear end of said rearwardly extending guiding member when lowered for raising said idler pulley.

ELLSWORTH D. WILKIN.

REFERENCES CITED

The following references are of record in the file of this patent:

UNITED STATES PATENTS

| Number | Name | Date |
|---|---|---|
| 258,242 | Merritt | May 23, 1882 |
| 665,820 | Willings | Jan. 8, 1901 |
| 2,047,362 | Dunford | July 14, 1936 |